United States Patent Office 3,689,451
Patented Sept. 5, 1972

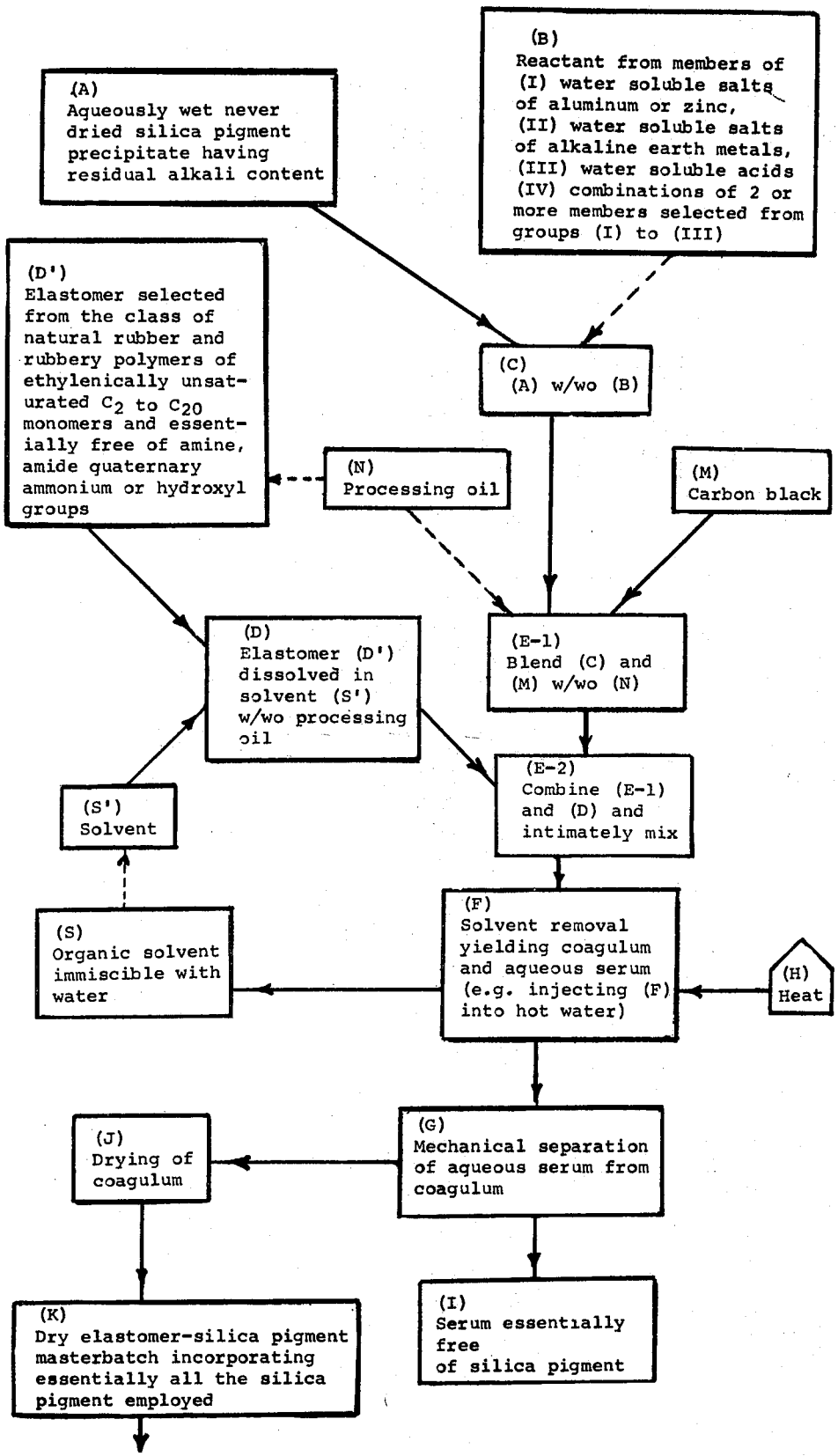

3,689,451
ELASTOMER-SILICA PIGMENT MASTERBATCHES AND PRODUCTION PROCESSES RELATING THERETO
Oliver W. Burke, Jr., Fort Lauderdale, Fla.
(1510 SW. 13th Court, Pompano Beach, Fla. 33061)
Continuation-in-part of application Ser. No. 798,215, Sept. 16, 1968, which is a division of application Ser. No. 611,250, Jan. 24, 1967, now Patent No. 3,523,096, which in turn is a continuation-in-part of applications Ser. No. 458,379 and Ser. No. 458,420, both May 24, 1965, and Ser. No. 479,806, Aug. 16, 1965, now Patent No. 3,401,017. This application July 16, 1970, Ser. No. 55,454
Int. Cl. C08c 11/10; C08k 1/08
U.S. Cl. 260—33.6 AO
9 Claims

ABSTRACT OF THE DISCLOSURE

Curbing of silica pigment losses and the promotion of uniformity of product in the preparation of an elastomer-silica pigment masterbatch are effected (a) by combining (1) 5 to 75 parts by weight, dry basis, of an aqueously wet hydrated silica pigment precipitate which has a bound alkali content, which has been prepared by precipitation from an aqueous alkali metal silicate solution, and which has been continuously maintained in an aqueously wet state without having been dried after its precipitation, with (2) 5 to 75 parts by weight of carbon black; with or without processing oil and reactant selected from the water soluble salts of aluminum, zinc, and alkaline earth metals, and water soluble acids; (3) combining the resulting wet silica pigment-carbon composition with a solvent dispersion of the elastomer; and (b) removing the solvent and aqueous phase and recovering the resulting combination as a masterbatch essentially without loss of silica pigment.

CROSS REFERENCE TO RELATED APPLICATIONS

This application is a continuation-in-part of copending application Ser. No. 798,215, filed Sept. 16, 1968, now abandoned, as a division of application Ser. No. 611,250, filed Jan. 24, 1967, now U.S. Pat. 3,523,096, said application Ser. No. 611,250 having been a continuation-in-part of earlier applications Ser. No. 458,420, filed May 24, 1965, now abandoned; Ser. No. 458,379, filed May 24, 1965, now abandoned; and Ser. No. 479,806, filed Aug. 16, 1965, now U.S. Pat. 3,401,017, the disclosures of all of which are incorporated herein by reference. Furthermore, this application is directed to a species of invention that was nonelected in applicant's copending application Ser. No. 55,384, filed July 16, 1970, and, pursuant to a restriction requirement, was withdrawn from consideration in that case.

BACKGROUND OF THE INVENTION

(1) Field of the invention

This invention relates to the preparation for the rubber trade of elastomer pigment masterbatches from elastomers and precipitated silica pigments.

SUMMARY OF THE INVENTION

It is known to those skilled in the art to prepare hydrated silica pigment for the reinforcement of rubber by precipitation from aqueous solutions of alkali metal silicates with the aid of carbon dioxide, and to carry out such precipitation in manners to avoid the formation of gelatinous masses (i.e. the formation of silica gel) and to promote the precipitation of a silica pigment in finely divided form (i.e. in particles in the reinforcing size range of about 0.015 to about 0.150 micron, preferably 0.02 to 0.06 micron) and to recover the pigment from the resulting wet silica pigment by filtration, washing and drying.

The wet silica pigments formed by precipitation from alkali metal silicate solutions with the aid of carbon dioxide have a bound alkali content in the range of about 0.1 to 10% by weight as $Na_2O$, and upon being dried in this state form aggregate, from the pigment particles of reinforcing size, which aggregates are of much greater than reinforcing size and will not adequately disperse (i.e. break down into particles of reinforcing size) when incorporated into rubber either by dry compounding or latex compounding.

When one treats such alkaline wet silica pigments with water soluble salts of alkaline earth metals, e.g. calcium salts, to substantially replace the bound alkali metal of the silica, the resulting pigment, when dried, still evidences the formation of aggregates of greater than reinforcing size, which do not adequately disperse in the rubber.

When one treats the alkaline wet silica pigments with the water soluble salts of aluminum and/or zinc, to substantially replace the alkali metal content thereof, the resulting acidic pigment, when dried, disperses to a greater extent in rubber, evidencing less aggregation than the neutral and alkaline products referred to above.

Finally, when one renders the wet silica pigment strongly acidic, by treatment with sulfuric acid and drying, the resulting strongly acidic product is more readily dispersible in rubber, and exhibits minimum aggregation; however, such highly acidic pigments are not practicable for use in the reinforcement of rubbers, since their acidity adversely effects vulcanization thereof.

Thus the drying of the wet silica pigment in alkaline, neutral, and moderately acidic states, in each instance causes the formation of aggregates of pigment particles to a greater or lesser degree which aggregation prevents adequate dispersion of the dry pigment in the rubber; the formation of these aggregates by the drying of the pigment is irreversible; and they remain mostly as aggregates that do not disperse in the rubber either by dry compounding or latex compounding.

This invention is based on the premise that uniformity of an elastomer-pigment masterbatch depends both on obtaining incorporation of a measured quantity of pigment in the masterbatch (e.g. avoiding loss of pigment in the serum in wet masterbatching) and adequate dispersion of the pigment in the elastomer in particles of reinforcing size (e.g. minimizing the pigment aggregation problem); and the present invention provides a process for accomplishing these ends by forming the masterbatch from aqueously wet hydrated silica pigment precipitates having a bound alkali content of 0.1 to 10% by weight as $Na_2O$; which has been prepared by precipitation from an aqueous solution of alkali metal silicate with the aid of carbon dioxide; and which has continuously been maintained in an aqueously wet state after its precipitation without having been dried therefrom; and which is combined with an elastomer dispersion in the still aqueously wet state, with special provisions for avoiding loss of pigment in the aqueous serum and promoting uniformity of product in the masterbatch.

Thus the present invention, inter alia, provides a simple and efficient process for the curbing of silica pigment losses and the promotion of uniformity of product in the preparation of masterbatches of measured silica pigment content. As shown in the drawing, the first part of the process consists essentially in (A) Providing an aqueous slurry containing 5 to 75 parts by weight, dry basis, of hydrated silica pigment precipitate which has a bound alkali content in the range of 0.1 to 10% by weight as $Na_2O$; which has been prepared by precipitation from an aqueous solution of alkali-metal silicate with the aid of carbon dioxide; and which has continuously been maintained in an aqueous phase without having been dried after its precipitation;

(B) Providing when used in step (C) reactant material selected from the class consisting of the members of the following groups: Group (I) the water soluble salts of aluminum or zinc; Group (II) the water soluble salts of the alkaline earth metals; Group (III) the water soluble acids; and Group (IV) combinations of two or more members selected from Groups (I), (II) and (III);

(C) Combining the wet silica pigment provided by step (A) with reactant material provided in step (B) in an amount in the range of from 0 to at least about a stoichiometric equivalent of the alkalinity of the said pigment then blending the pigment (as at E-1) with from 5 to 75 parts by weight of carbon black—from (M)—with the limitation that the total of silica pigment and carbon black, dry basis, not exceed 80 parts by weight, and from 0 to 45 parts by weight of processing oil—from (N)— thereby providing a wet pigment composition for use in step (E-2);

(D) Providing an organic solvent dispersion of the elastomer containing (1) 100 parts of the elastomer by weight, and (2) the solvent of which is essentially water immiscible;

(E-2 intimately mixing the solvent dispersion of elastomer—from (D)—with (1) the pigment blend—from (E-1)—and (F) to (K) Removing the solvent and aqueous phase and recovering the resulting combination as a masterbatch, whereby there is formed a masterbatch containing essentially all of the pigment employed in step (E-1).

The elastomer (D') is dissolved in solvent (S')—which may be recycled solvent (S)—to form solution (D) and said solvent itself, or as an azeotrope with water, preferably has a boiling point lower than that of water at atmospheric pressure, and the viscosity of the elastomer-solvent dispersion (i.e. solution) (D) preferably should be selected in the range of 5,000 to 50,000 centipoises to facilitate the intimate blending as at (E-2), of the elastomer-solvent solution and the pigment blend—from (E-1)— which may be combined therewith in alkaline, essentially neutral, or acidic form as exemplified hereinafter.

In preferred embodiments of the invention, the reactant employed in step (C) may be chosen predominantly from Group (I) or Group (III) and the serum produced is then acidic or alkaline, respectively, and corresponding compounds are contained in the masterbatch; and in further preferred embodiments, the blend (E-2), and the masterbatch (K) produced therefrom, contains at least 5 parts of processing oil.

The term "water soluble acids" as used herein designates the inorganic and organic acids which are water soluble both as free acids and in the form of alkali metal or ammonium salts. Examples of such acids are hydrochloric, sulfuric, nitric, phosphoric, formic, acetic, hydroxyacetic, the chloroacetic acids, propionic, oxalic, tartaric, citric, maleic, and the like.

The silica-elastomer masterbatch (K) is recovered from the intimate mixture formed at (E-1) by separating the volatiles from the coagulum, preferably in two steps (F) and (G), when the solvent or its aqueous azeotrope can be volatilized in step (F) prior to separation of the solids from the remaining aqueous phase in step (G). The volatilizing of the solvent, step (F) to convert the mixture (E-2) to coagulum and aqueous serum may be effected by running the dispersion (E-2) into hot water. The greater part of the separation of the coagulum from the aqueous serum in step (G) is preferably effected by mechanical dewatering, e.g. filtration, decanting, centrifuging, etc., to reduce the heat requirement for final drying of the masterbatch. The serum removed by mechanical dewatering is found to be essentially free of silica pigment as indicated at (I) in the drawing and the dry elastomer-silica pigment masterbatch thus incorporates essentially all of the silica pigment employed. The process thus curbs silica losses and assures a uniform silica pigment content in the masterbatch.

DESCRIPTION OF PREFERRED EMBODIMENTS

Preferred embodiments illustrative, but not restrictive, of the invention are set forth in Examples 1 through 16. In these examples the hydrated silica pigment precipitate has a bound alkali content in the range of 0.1 to 10% by weight as $Na_2O$ and has been prepared by precipitation from an aqueous solution of alkali metal silicate with the aid of carbon dioxide and said silica precipitate has been continuously maintained in the aqueous phase without having been dried after its precipitation, and the aqueous silica pigment is combined with the necessary preparation of carbon black, from 0 to at least a stoichiometric equivalent, based on the alkalinity of the silica pigment slurry, of reagent selected from (I) the water soluble salts of aluminum, zinc and alkaline earth metals, (II) the water soluble acids and (III) combinations thereof, and from 0 to 45 parts by weight of processing oil.

In these examples, the combination of the elastomer-solvent dispersion and the silica pigment blend was prepared by intimate mixing in the high speed, high shear Waring Blendor. The removal of solvent from the intimate mixture of the treated aqueous silica and the rubber-cement was accomplished by injecting the said mixture into boiling water and the volatile solvent readily boiled off leaving a wet coagulum or wet crumb in the aqueous serum, which serum was free of silica or essentially free of silica.

The invention may be employed to improve wet silica-polymer solution masterbatching and masterbatches, using any alkaline slurry of never dried wet silica pigment containing bound alkali, and is applicable to the formation of masterbatches therewith with elastomer-organic solvent dispersions, i.e. cements, of all solvent soluble elastomers.

Silica pigments containing residual alkali suitable for masterbatching in accordance with the present invention are usually precipitated by the gradual acidulation of aqueous sodium silicate solution with the aid of carbon dioxide, and in accordance with the preferred embodiments of this invention are continuously maintained in an aqueously wet state without ever having been dried therefrom until incorporated in the masterbatching process.

Elastomers (and solvents)

The elastomers employed in solution in the present invention include, but are not limited to, those prepared in anhydrous solvent systems, e.g. with the aid of catalyst systems employing metal alkyls and/or transition metal halides. In certain of these systems after the polymerization of the olefin and/or diolefin is complete and the catalyst has been removed, the elastomer is already in solvent solution or can readily be transferred to a solvent solution suitable for masterbatching as practiced in this invention.

In selecting the solvent the more highly volatile hydrocarbon, or halohydrocarbon, or halocarbon solvents are desirable, e.g.: butane, pentane, hexane, cyclohexane, methylene chloride, carbon tetrachloride, and the like.

The solvent cements, dispersions, or solutions employable herein thus include, but are not limited to, the diene homopolymer rubbers such as polybutadiene, polyisoprene, polychloroprene; those of diene copolymer rubbers such as the copolymers of diene monomers and monomers containing and copolymerizable therewith through a single ethylenically unsaturated group, e.g. butadiene-styrene, butadiene-acrylonitrile or methacrylontrile, butadiene-acrylate or methacrylate ester; and rubbery copolymers of hydrocarbon monomers with polar vinylidene (including vinyl) monomers copolymerizable therewith, elastomers from olefins and/or cyclic olefins and/or cycle diolefins and/or dicyclic diolefins including the ethylene-propylene copolymers, the ethylene-propylene terpolymers, the ethylene-butylene copolymers and terpolymers, the butadiene-monoolefin interpolymers, the isobutylene-isoprene copolymers, and the like, elastomers from olefin oxides, poly-aromatic ethers and poly-alkyl ethers and other elastomers containing oxygen in the molecule, the fluorohydrocarbon and fluorocarbon elastomers, as well as mixtures and combinations thereof with processing oils.

Preferably all, or at least the designated minimum proportion of the carbon black (M) is pre-blended with the wet silica pigment (at E–1) as indicated by the solid line in the drawing, rather than being pre-mixed with the elastomer solution (D) as indicated by the optional broken line in the drawing.

Carbon black

By the term "carbon black" as used herein is meant any carbon blacks suitable for use by the rubber industry and set forth under the title "carbon blacks" at pages 251 to 264 of the publication entitled "Materials and Compounding Ingredients for Rubber," compiled by J. V. Del Gatto, published by Rubber World, 1968, and herein incorporated by reference, e.g. Philblack O (TM), Statex K (TM), Statex 160 (TM), Kosmobile 77 (TM), Thermax (TM), and the like.

Processing oils

The term "processing oils" as used herein is meant rubber processing material of both liquid and solid types (if required the solids types can be converted to the liquid state for use herein with the aid of solvent or plasticizer) and include the processing materials set forth under "Plasticers and Softeners" at pp. 149, 20, 214 of the publication entitled "Materials and Compounding Ingredients for Rubber," compiled by J. V. Del Gatto, published by Rubber World, 1968, and herein incorporated by reference and among the types of processing materials especially suitable for use in this invention are (a) the coal tar oils and pitches e.g. Bardol (TM), Bardol B (TM); (b) the asphalts, e.g. BRH #2 (TM); (c) the petroleum oils including the paraffinic, naphthenic, aromatic, and highly aromatic categories, which are commercially available under trademark designations, Sunpar (TM), Sundex (TM), Sunthene (TM), Circosol (TM), and Shellflux (TM) oils, and the like, such as Circosol 2XH (TM), Sundex 53 (TM), Shell SPX 97 (TM), Dutrex-20, -419, -726, -757, -787 (TM), and Califlux TT (TM) and other oils suitable for rubber comopunding or the oil extension of synthetic rubber; (d) the coumarone-indene oils and resins, e.g. Cumar Resin RH, -P10, -T (TM); (e) the liquid ester type plasticizers, e.g. dibutyl phthalate, di-(2-ethylhexyl) phthalate, diglycol laurate, dibenzyl sebacate, tributoxyethyl phosphate, tricresyl phosphate and the like; (f) the phenol formaldehyde thermoplastic resins, e.g. Durez 12687, 12707 (TM) and the like; (g) the hydrocarbon resins, e.g. Neville-LX 782, -LX 125, (TM), Para-Flux, Para Resin 2457 (TM); (h) the hydrocarbon resin-coumarone indene polymers, e.g. Picco Resins (TM); (i) the pine tars and pine tar oils, rosin and rosin oils, and tall oil and its derivatives, e.g. PT-101, PT-401, PT-800 (TM); and the like.

EXAMPLES

The following examples will serve to illustrate the invention in more detail:

Silica preparation for examples

The aqueous slurry of precipitated silica employed in the examples was prepared in a manner similar to Example 9 of U.S. Pat. No. 3,250,594 except that the ratio of 41° Bé. commercial sodium silicate ($Na_2O/(SiO_2)_{3.22}$) to water was approximately 1 to 4.5 by weight. The carbon dioxide was supplied to the sodium silicate with the aid of a single submerged combustion burner up to the appearance of the Tyndall effect and with two such burners thereafter. The use of the submerged combustion burners was according to U.S. Pat. No. 3,372,046. The silica product was filtered and washed to reduce the soluble salts to the range of 1 to 2% and the filter cake had a solids of approximately 10% by weight. The resulting aqueous silica slurry was designated wet alkaline silica pigment-I, and had a bound alkali content of about 1.5% by weight as $Na_2O$, and a serum pH of about 8.5 (8.5 to 9.5).

A portion of this alkaline silica filter cake was slurried with about a half volume of water and was acidified to a pH of 4.5 with dilute sulfuric acid and as a filter cake, was washing to a filtrate pH of about 7 to 7.5, had a solids of approximately 10% by weight. The resulting aqueously wet silica slurry was designated wet silica pigment-II.

The just described filter cakes having a solids content of about 10% by weight are embraced within the term "wet silica pigment" (which herein connotes aqueously wet silica pigment) as are wet pigments of more reduced water content which can be prepared by pressing the said filter cakes, or of augmented water content, e.g. slurries having less than 10% solids content, and the terms "aqueously wet silica pigment" or "aqueously wet state," as employed herein are generic to all such conditions. Thus these terms as employed herein embrace aqueously wet silica pigment materials having a solids content in the range of about 1% to about 65% solids, dry basis, by weight; however, for economy in the practice of the invention wet silica pigments of reduced water content (solids content 8 to 36%) are preferred.

To determine pigment quality a portion of wet silica pigment-II was dried at 105° C., micropulverized and compounded as set forth in Table I hereof.

TABLE I

| Compound ingredients: | Quantities (pts. wt.) |
|---|---|
| Butadiene-styrene copolymer [1] | 100 |
| Silica pigment-II dried | 60 |
| Antioxidant, 2,2'-methylene-bis (4-methyl-6-t.-butylphenol) | 2.0 |
| Magnesium oxide | 4.0 |
| Paracoumarone-indene resin [2] | 10.0 |
| Zinc oxide | 1.0 |
| N-tert-butyl-2-benzothiazole-sulphenamide | 0.75 |
| N,N'-di-o-tolylguanidine | 1.5 |
| Triethanolamine | 1.0 |
| Phthalic anhydride | 0.75 |
| Sulfur | 2.25 |

[1] SBR 1502.
[2] Cumar Resin RH, a trademark product of Allied Chemical Corp.

The compound was aged overnight, re-milled and cured for 45 minutes at 287° F.

The physical test data for the vulcanizate prepared with the foregoing silica pigment is set forth in Table II hereof.

TABLE II

| Silica tested (in vulcanizate): | Silica pigment-II |
|---|---|
| Hardness (Shore A) | 72 |
| Tensile (p.s.i.) | 3530 |
| Modulus (300%) | 1140 |
| Elong. (percent) | 575 |

The processes of the examples are adaptable for either continuous or batch production of the masterbatch. When desired, a processing oil can be added to the polymer solution and the carbon black to the wet silica then both combined with the aid of high shear mixing.

In the treatment of the wet silica pigment prior to masterbatching with the elastomer solution, any soluble aluminum salt may be substituted for the hydrated aluminum sulfate, e.g. aluminum ammonium sulfate or aluminum sodium sulfate, and minor amounts of ammonia thus may be employed without detriment to the process.

TABLE III.—SILICA-CARBON BLACK MASTERBATCHES FROM SOLUTION OF POLYMER

[Parts by wt.]

| Example | 1 | 2 | 3 | 4 |
|---|---|---|---|---|
| (A) Silica pigment slurry-treated: | | | | |
| (a) Silica pigment aqueous slurry: | | | | |
| Alkaline silica pigment-I (pH 9.5) | | | | |
| Dry solids basis | 2.5 | 2.5 | 1.0 | 1.0 |
| Water | 25 | 25 | 10 | 10 |
| (b) Reagent aqueous solution: | | | | |
| 2% aluminum sulfate [1] | 9 | 9 | 3.7 | 3.7 |
| Silica slurry pH | 5.0 | 5.0 | 5.0 | 5.0 |
| (c) Treated silica pigment: | | | | |
| Filtered (X) | X | X | X | X |
| Filter cake | 20 | 20 | 8.0 | 8.0 |
| (B) Carbon black: Carbon black [2] | 2.5 | 2.5 | 5.0 | 5.0 |
| (C) Blending (A) plus (B): Blender, min.[3] | 0.5 | 0.5 | 0.5 | 0.5 |
| (D) Polymer solution: | | | | |
| (a) Polymer: | | | | |
| Isobutyleneisoprene [4] | 10 | 10 | | |
| Butadienestyrene [5] | | | 10 | |
| Ethylene-propylene terpolymer [6] | | | | 10 |
| (b) Solvent: | | | | |
| Hexane | 90 | 90 | 90 | 90 |
| Antioxidant [7] | 0.2 | 0.2 | 0.2 | 0.2 |
| (c) Solvation conditions: | | | | |
| Temp., °C | 60 | 60 | 60 | 60 |
| Time agitated, hrs | 12 | 12 | 12 | 12 |
| (E) Blending (C) and (D): Blender, min.[3] | 0.5 | 0.5 | 0.5 | 0.5 |
| (F) Solvent removal:[8] | | | | |
| Boiling water (X) | X | X | X | X |
| Silica separation into water phase | None | None | None | None |
| (G) Masterbatch: Dried (105° C.)(X) | X | X | X | X |

[1] Aluminum sulfate Al₂(SO₄)₃·14H₂O.
[2] Statex 160HR (a trademark product).
[3] Waring Blendor (a trademark product).
[4] Butyl rubber 268 (a trademark product).
[5] Solprene 300, a solution polymerization random 75/25 copolymer of butadiene and styrene.
[6] Nordel 1320 (a trademark product), a terpolymer of ethylene, propylene and a non-conjugated diene.
[7] The antioxidant is 2,2'-methylene-bis-(4-methyl-6-t.-butylphenol).
[8] The silica-carbon black solvated polymer dispersion is dropped into boiling water to vaporize the solvent and the silica-carbon black polymer masterbatch is recovered and dried.

TABLE IV.—SILICA-CARBON BLACK MASTERBATCHES FROM SOLUTION OF POLYMER

[Parts by wt.]

| Example | 5 | 6 | 7 | 8 |
|---|---|---|---|---|
| (A) Silica pigment slurry-treated: | | | | |
| (a) Silica pigment aqueous slurry: | | | | |
| Alkaline silica pigment-I (pH 9.5) | | | | |
| Dry solids basis | 1 | 1 | 1 | 1 |
| Water | 10 | 10 | 10 | 10 |
| | 3 | 3 | 3 | 3 |
| (b) Reagent aqueous solution: | | | | |
| 2% aluminum sulfate [1] | 3.7 | | | |
| 2% calcium chloride | | 2.3 | | |
| 2% barium chloride | | | 4.0 | |
| 2% magnesium sulfate | | | | 2.3 |
| (c) Treated silica pigment: | | | | |
| Filtered (X) | X | X | X | X |
| Filter cake | 8 | 8 | 8 | 8 |
| (B) Carbon black: Carbon black [2] | 5 | 5 | 5 | 5 |
| (C) Blending (A) and (B): Blender, min.[3] | 0.5 | 0.5 | 0.5 | 0.5 |
| (D) Polymer solution: | | | | |
| (a) polymer: isobutyleneisoprene [4] | 10 | 10 | 10 | 10 |
| (b) Solvent: | | | | |
| Hexane | 90 | 90 | 90 | 90 |
| Antioxidant [5] | 0.2 | 0.2 | 0.2 | 0.2 |
| (c) Solvation condition: | | | | |
| Temp. °C | 60 | 60 | 60 | 60 |
| Time agitated, hrs | 12 | 12 | 12 | 12 |
| (E) Blending (C) and (D): Blending, min.[3] | 0.5 | 0.5 | 0.5 | 0.5 |
| (F) Solvent removal:[6] | | | | |
| Boiling water (X) | X | X | X | X |
| Silica separation into water phase | None | None | None | None |
| (G) Masterbatch: Dried (105° C.) (X) | X | X | X | X |

[1] Aluminum sulfate Al₂(SO₄)₃·14H₂O.
[2] Statex 160 (a trademark product).
[3] Waring Blendor (a trademark product).
[4] Butyl rubber 268 (a trademark product).
[5] The antioxidant is 2,2'-methylene-bis-(4-methyl-6-t.-butylphenol).
[6] The silica-carbon black solvated polymer dispersion is dropped into boiling water to vaporize the solvent and the silica-carbon black polymer masterbatch is recovered and dried.

TABLE V.—SILICA-CARBON BLACK MASTERBATCHES FROM SOLUTION OF POLYMER

[Parts by wt.]

| Example | 9 | 10 | 11 | 12 |
|---|---|---|---|---|
| (A) Silica pigment slurry-treated: | | | | |
| (a) Silica pigment aqueous slurry: | | | | |
| Alkaline silica pigment-I (pH 9.5) | 10 | 10 | 10 | 10 |
| Dry solids basis | 1 | 1 | 1 | 1 |
| Water | 3 | 3 | 3 | 3 |
| (b) Reagent aqueous solution: | | | | |
| 2% aluminum sulfate [1] | 3.7 | | | |
| 2% zinc sulfate | | 3.0 | | |
| 2% sulfuric acid | | | 1.7 | |
| (c) Treated silica pigment: | | | | |
| Filtered (X) | X | X | X | X |
| Filter cake | 8 | 8.6 | 9 | 10 |
| (B) Carbon black: Carbon black [2] | 5 | 5 | 5 | 5 |
| (C) Blending (A) and (B): Blending, min.[3] | 0.5 | 0.5 | 0.5 | 0.5 |
| (D) Polymer solution: | | | | |
| (a) Polymer: | | | | |
| Ethylenepropylene [4] | 10 | | | |
| Butadiene-styrene [5] | | 10 | | |
| Isobutylene-isoprene [6] | | | 10 | 10 |
| (b) Solvent: | | | | |
| Benzene | 90 | 20 | | |
| Hexane | | 70 | 90 | 90 |
| Antioxidant [7] | 0.2 | 0.2 | 0.2 | 0.2 |
| (c) Solvation conditions: | | | | |
| Temp., °C | 60 | 60 | 60 | 60 |
| Time agitated, hrs | 12 | 12 | 12 | 12 |
| (E) Blending (C) and (D): Blender, min.[3] | 0.5 | 0.5 | 0.5 | 0.5 |
| (F) Solvent removal:[8] | | | | |
| Boiling water (X) | X | X | X | X |
| Silica separation into water phase | None | None | None | None |
| (G) Masterbatch: Dried (105° C.) (X) | X | X | X | X |

[1] Aluminum sulfate Al₂(SO₄)₃·14H₂O.
[2] Statex 160 (a trademark product).
[3] Waring Blendor (a trademark product).
[4] EPR-404 (a trademark product).
[5] SB-R 1502 (a butadiene-styrene copolymer cold rubber produced by emulsion polymerization).
[6] Butyl rubber 268 (a trademark product).
[7] The antioxidant is 2,2'-methylene-bis-(4-methyl-t-t.-butylphenol)
[8] The silica-carbon black solvated polymer dispersion is dropped into boiling water to vaporize the solvent and the silica-carbon black polymer masterbatch is recovered and dried.

TABLE VI.—SILICA-CARBON BLACK MASTERBATCHES FROM SOLUTION OF POLYMER

[Parts by wt.]

| Example | 13 | 14 | 15 | 16 |
|---|---|---|---|---|
| (A) Silica pigment slurry-treated: | | | | |
| (a) Silica pigment aqueous slurry: | | | | |
| Alkaline silica pigment-I (pH 9.5) | 10 | 10 | 30 | 1.0 |
| Dry solids basis | 1 | 1 | 3 | 0.5 |
| Water | 3 | 3 | 9 | 1.5 |
| (b) Reagent aqueous solution: 2% aluminum sulfate [1] | 3.7 | 3.7 | 11.1 | 2.0 |
| (c) Treated silica pigment: | | | | |
| Filtered (X) | X | X | X | X |
| Filter cake | 8 | 8 | 24 | 4.0 |
| (B) Carbon black: | | | | |
| Thermax* | 5 | | | |
| Statex B* | | 5 | | |
| Philblack O* | | | 2 | 6 |
| Water | | | | 5 |
| (C) Processing oil: Sundex 2XH* | | | | 1 |
| (D) Blending (A) and (B):[2] Blender, min.[3] | | | | |
| (E) Polymer solution: | | | | |
| (a) Polymer: Isobutylene-Isoprene [4] | 10 | 10 | 10 | 10 |
| (b) Solvent: | | | | |
| Hexane | 90 | 90 | 90 | 90 |
| Antioxidant [5] | 0.2 | 0.2 | 0.2 | 0.2 |
| (c) Solvation conditions: | | | | |
| Temp. °C | 60 | 60 | 60 | 60 |
| Time agitated, hrs | 12 | 12 | 12 | 12 |
| (F) Blending (D) and (E): Blender, min.[3] | 0.5 | 0.5 | 0.5 | 0.5 |
| (G) Solvent removal:[6] | | | | |
| Boiling water (X) | X | X | X | X |
| Silica separation into water phase | None | None | None | None |
| (H) Masterbatch: Dried (105° C.) (X) | X | X | X | X |

*Trademark product.
[1] Aluminum sulfate Al₂(SO₄)₃14H₂O.
[2] And (C) in Example 16.
[3] Waring Blendor (a trademark product.)
[4] Butyl rubber 268 (a trademark product.)
[5] The antioxidant 2,2'-methylene-bis-(4-methyl-6-t.-butylphenol).
[6] The silica-carbon black solvated polymer dispersion is dropped into boiling water to vaporize the solvent and the silica-carbon black polymer masterbatch is recovered and dried.

The masterbatches prepared in accordance with the present invention may be compounded with vulcanizing ingredients and vulcanized by any suitable recipe (e.g. the recipe set forth in Table I, above) to form useful vulcanizates.

From the foregoing disclosure, it will be appreciated, inter alia, that the present invention improves elastomer-silica pigment masterbatches by employing silica pigments combined with specified treatments to improve the compatibility of said pigments with elastomer materials in general.

In certain co-pending applications filed concurrently herewith, different modes of improving elastomer-silica pigment masterbatches are provided by employing elastomers supplied with certain substituent groups improving the compatibility of the elastomers with the aqueously wet silica pigments.

To maintain clear lines of division between the co-pending applications, the claims of this application recite, and rely for patentability on, only its own improvements, without prejudice to their applicability to processes or products employing such improvements along with different improvement disclosed in one of said co-pending applications.

Also, while there have been described herein what are at present considered preferred embodiments of the invention, it will be obvious to those skilled in the art that modifications and changes may be made therein without departing from the essence of the invention. It is therefore understood that the exemplary embodiments are illustrative and not restrictive of the invention, the scope of which is defined in the appended claims, and that all modifications that come within the meaning and range of equivalents of the claims are intended to be included therein.

What is claimed is:

1. A process for the curbing of silica pigment losses and the promotion of uniformity of product in the preparation of a silica pigment-elastomer masterbatch, which process comprises:
   (a) providing an organic solvent dispersion of elastomer containing (1) 100 parts of the elastomer by weight, (2) the solvent of which is essentially water immiscible, and (3) the elastomer of which is soluble or dispersible in said solvent;
   (b) providing 5 to 75 parts by weight, dry basis, of aqueously wet hydrated silica pigment precipitate which has a bound alkali content in the range of 0.1 to 10% by weight as $Na_2O$; which has been prepared by precipitation from an aqueous solution of alkali metal silicate with the aid of carbon dioxide; which has been filtered and washed; and which has continuously been maintained in an aqueously wet state without having been dried after its precipitation;
   (c) combining the wet silica pigment provided by step (b) with from 0 to at least a stoichiometric equivalent, based on the alkalinity of the silica pigment slurry, of reactant selected from the class consisting of the members of the following groups: Group (I) the water soluble salts of aluminum or zinc; Group (II) the water soluble salts of the alkaline earth metal; Group (III) water soluble acids; and Group (IV) combinations of any two or more of such members; thereby to provide a wet silica pigment for use in step (d);
   (d) then intimately mixing (1) the wet silica pigment provided for use by step (c), (2) from 5 to 75 parts by weight of carbon black with the limitation that the total of silica pigment and carbon black, dry basis, not exceed 80 parts by weight, (3) from 0 to 45 parts by weight of processing oil, and (4) the solvent dispersion of elastomer provided by step (a); and
   (e) separating the volatiles from the resulting masterbatch.

2. A process for preparing a masterbatch from wet silica pigment and a solvent dispersion of elastomer as claimed in claim 1, in which in step (d) the ingredients other than the solvent dispersion of elastomer are first intimately mixed together and the combination thereof is intimately mixed with the solvent dispersion of elastomer.

3. A process as claimed in claim 1, in which at least 5 parts by weight of processing oil are employed in step (d).

4. A process for preparing a masterbatch from wet silica pigment and a solvent dispersion of elastomer as claimed in claim 1, in which the elastomer constitutes from 5 to 50% of the solvent dispersion provided in step (a).

5. A process as claimed in claim 1, in which the solvent employed in step (a) itself or as an aqueous azeotrope has a boiling point lower than that of water at atmospheric pressure, and in which step (e) is effected by (1) volatilizing solvent from the intimate mixture to convert said mixture to coagulum and aqueous serum, and (2) then separating the coagulum from the serum as a masterbatch.

6. A process as claimed in claim 5, in which in step (e) the mixture produced by step (d) is injected into hot water to vaporize the solvent therefrom, followed by removal of the water from the resulting aqueously wet coagulum.

7. A process as claimed in claim 1, in which in step (d) the wet silica pigment as a partially dewatered cake and dry carbon black are first combined into an intimate paste by being subjected to high shear working and the so produced paste is then intimately mixed with the solvent dispersion of elastomer by high shear working.

8. A process as claimed in claim 1 in which at least 5 parts by weight of processing oil are employed in step (d).

9. A process as claimed in claim 7, in which at least 5 parts by weight of processing oil are employed in step (d) by incorporating the same in the paste with the wet silica pigment and carbon black.

References Cited
UNITED STATES PATENTS

| | | | |
|---|---|---|---|
| 2,821,232 | 1/1958 | Wolf | 260—763 |
| 2,953,556 | 9/1960 | Wolfe et al. | 260—41.5 PM |
| 3,081,276 | 3/1963 | Snyder et al. | 260—41.5 PM |
| 3,172,726 | 3/1965 | Burke et al. | 260—41.5 A |
| 3,244,660 | 4/1966 | Herold | 260—29.7 |
| 3,250,594 | 5/1966 | Burke et al. | 260—41.5 A |
| 3,350,342 | 10/1967 | Begley | 260—41.5 |
| 3,411,970 | 11/1968 | Perrin | 156—297 |
| 3,449,284 | 6/1969 | Pollock | 260—41.5 |

LEWIS T. JACOBS, Primary Examiner

J. H. DERRINGTON, Assistant Examiner

U.S. Cl. X.R.

260—41.5 R, 41.5 A, 41.5 PM